United States Patent [19]
Sharp et al.

[11] 3,927,689
[45] Dec. 23, 1975

[54] EARTHQUAKE RESPONSIVE SAFETY VALVE

[75] Inventors: Mark B. Sharp, North Hollywood; Robert E. Sharp, Thousand Oaks, both of Calif.

[73] Assignee: Quake-Proof, Inc., Reseda, Calif.

[22] Filed: Feb. 25, 1974

[21] Appl. No.: 445,515

[52] U.S. Cl. .................................................. 137/45
[51] Int. Cl.² ........................................ F16K 17/36
[58] Field of Search ........................... 137/38, 39, 45

[56] References Cited
UNITED STATES PATENTS

| | | |
|---|---|---|
| 704,529 | 7/1902 | Foskett .............................. 137/38 |
| 2,255,965 | 9/1941 | Brandon ......................... 137/45 X |
| 2,853,089 | 9/1958 | Bair ...................................... 137/39 |
| 2,962,035 | 11/1960 | Wright et al ......................... 137/39 |
| 3,768,497 | 10/1973 | Mueller ................................ 137/38 |

FOREIGN PATENTS OR APPLICATIONS

| | | | |
|---|---|---|---|
| 5,132 | 2/1914 | United Kingdom .................. 137/45 |

*Primary Examiner*—Robert G. Nilson
*Attorney, Agent, or Firm*—William P. Green

[57] ABSTRACT

An earthquake responsive safety valve assembly including a valve element spring urged upwardly toward a closed position, and a shock actuated weight structure suspended above the valve element by a universal connection and having a lower portion which in a normal position of the weight structure blocks upward closing movement of the valve, but releases the valve for closing movement upon lateral deflection of the weight structure by an earthquake or the like.

15 Claims, 6 Drawing Figures

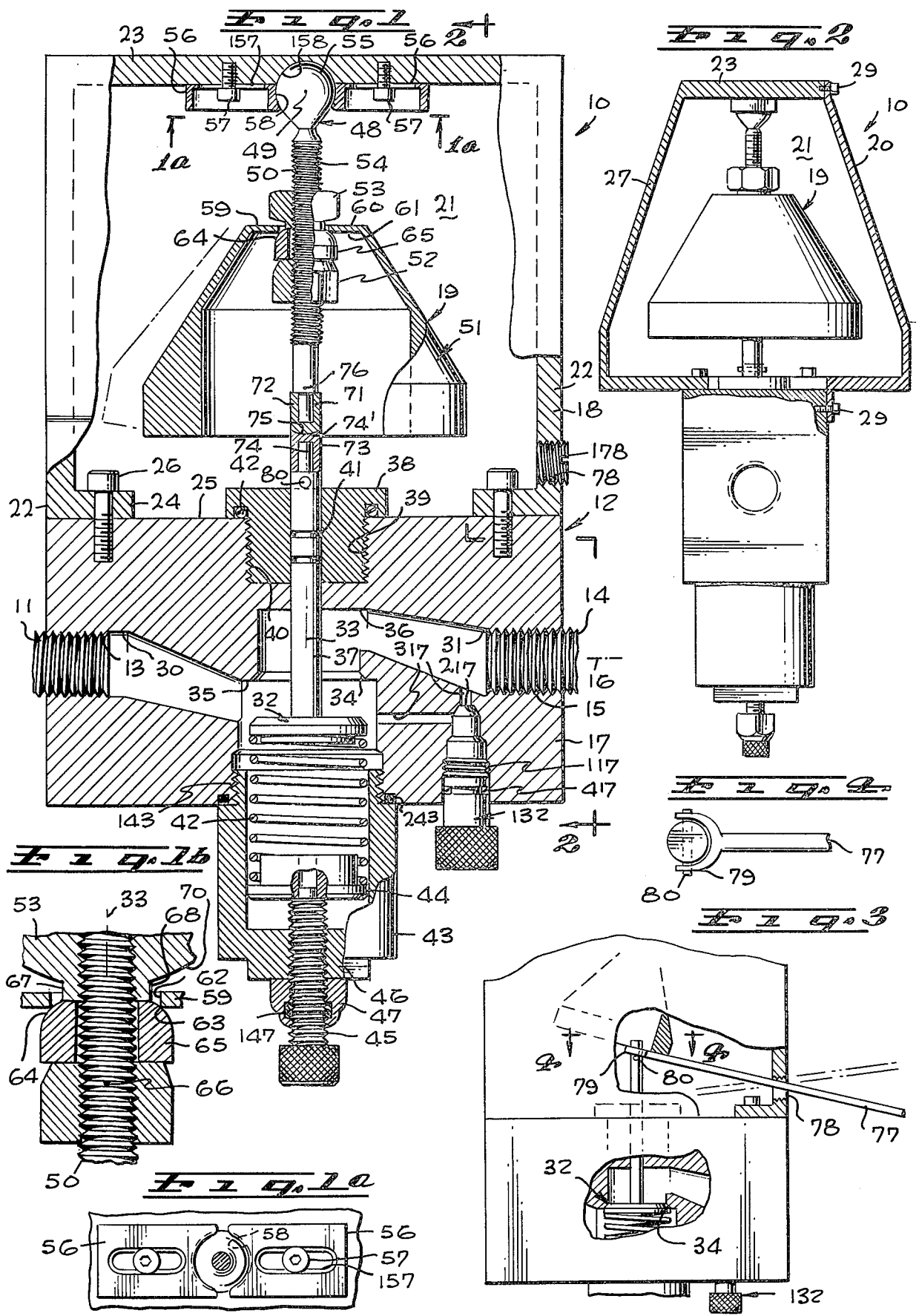

EARTHQUAKE RESPONSIVE SAFETY VALVE

BACKGROUND OF THE INVENTION

This invention relates to improved safety valves for automatically closing off a flow of a particular fluid, such as natural gas, in response to earthquake or other similar shock, to prevent fire or other damage which might result from continued flow of the fluid. Certain features of the invention have been shown in Disclosure Document No. 024357 heretofore filed in the U.S. Patent Office.

There have been developed in the past various types of earthquake actuated shut-off valves, including weights mounted for displacement by the shock of an earthquake in a manner releasing the valve for closing movement. For example, certain valves of this type have been shown in U.S. Pat. No. 2,255,965 issued Sept. 16, 1941, to R. E. Brandon. However, all such prior devices of which I am aware have had inherent structural disadvantages rather obviously detracting from their adaptability for wide-scale commercial use. For example, in some such devices, the weight has been mounted for its shock induced displacement by support elements, such as thin suspending wires or the like, which may break and require repair if the shock forces reach an excessive value. In some instances, the devices have purposely been designed with frangible parts which are intended to rupture or break on each response of the device to a shock of predetermined value, with a resultant necessity for servicing and replacement of the frangible part after each actuation. Further, most of the prior devices have been so constructed that, in order to respond properly to shock forces of the particular magnitude for which the device is designed, the shock responsive weight or mass must have such mobility as to also respond, undesirably, to relatively small forces which may be caused by frequently and normally occurring shocks to which there should be no response, such as vibration caused by passing trucks or other like vehicles, trains, aircraft, or the like. The valve may then close or tend to close when the minor vibrations occur, requiring servicing and resetting on each occasion, and on each closure interrupting the supply of gas or other controlled fluid to a user or users. Additionally, even in devices in which there has been no frangible part or permanent breakage of any element in the unit, the resetting of the valve after actuation has in most cases been more difficult than would be desired, thereby further detracting from the practicality of the devices for actual wide-scale use, particularly where this time consuming resetting operation has been required frequently after accidental or unintended closure of the valves by minor vibratory shocks. Other prior art devices, such as that shown in Hanson U.S. Pat. No. 2,054,563 issued Sept. 15, 1936, have included needlessly complex and intricate mechanisms for actuating a valve in response to weight movement, which mechanisms can only increase the cost of the device and detract from its reliability.

SUMMARY OF THE INVENTION

A shutoff valve constructed in accordance with the present invention is very simple structurally, and yet completely reliable in its capacity for positively closing off the flow of a flammable fluid or the like in response to a shock of predetermined intensity. The valve will not respond, however, to vibrations or shocks of lesser intensity, and further may be rendered readily and controllably adjustable to preset rather precisely the amount of force which will effect a closure. Additionally, the device does not include any easily frangible parts, and can sustain extremely high forces without permanent damage of any type. After a valve closing actuation, the unit can be easily and quickly reset by a simple resetting tool which can have access to the valve through an opening in a housing of the device.

To obtain these results, the device preferably includes a valve unit which is yieldingly urged upwardly toward a closed position, with the upward movement being controlled by a weight structure located above the valve and suspended from a supporting structure by a universal connection spaced above the weight and valve. When the weight structure is in a normal directly downwardly hanging position with respect to the suspending universal connection, a lower portion of the weight structure is received in blocking relation with respect to an upper portion of the valve unit, in a manner holding the valve unit in open condition. Lateral deflection of the weight structure, pivotally about the center of the universal connection, displaces the weight structure to a position in which it no longer blocks upward movement of the valve unit, and therefore releases the valve for closure.

The weight structure and valve unit are desirably formed to have interengaging faces, one of which contains a shallow recess into which the other projects slightly, in a manner tending to resist lateral deflection of the weight structure relative to the valve unit, and thereby require a force of predetermined value before the weight can be moved. To enable adjustment of this detenting effect, the two interengaging surfaces may be formed on the ends of detachable parts secured to the weight structure and valve unit, and adapted for removal and replacement with similar parts having different interfitting characteristics and therefore different predetermined holding effects.

The weight structure may be adjustable upwardly and downwardly relative to the universal connection, to vary the distance of the weight from the pivotal center, and thereby controllably vary the force required for actuation of the valve. Another adjustment may be attained by varying the force of a spring which urges the valve towards its closed condition, and which force therefore holds the interengaging faces of the weight structure and valve unit against one another.

Another feature of great practical importance resides in the formation of the movable weight structure of two sections, including a support part which controls actuation of the valve, and a weight proper which is mounted by the support part and actuates it, but which is free for some limited movement relative thereto. As a result, minor forces may displace the weight relative to the support part without causing actuation of the latter in a manner closing the valve. Greater forces, however, will move both sections of the weight structure and release the valve for closure. Preferably, the connection between these two sections is a second universal connection, desirably formed by provision of two engaging relatively movable spherically curved surfaces on the parts.

BRIEF DESCRIPTION OF THE DRAWING

The above and other features and objects of the invention will be better understood from the following detailed description of the typical embodiment illustrated in the accompanying drawing in which:

FIG. 1 is vertical section through an earthquake actuated valve constructed in accordance with the invention;

FIG. 1a is a fragmentary view taken on line 1a—1a of FIG. 1; FIG. 1b is a greatly enlarged fragmentary view corresponding to a portion of FIG. 1;

FIG. 2 is a reduced partially sectional view taken on line 2—2 of FIG. 1;

FIG. 3 is a view similar to FIG. 1, but on a reduced scale, and showing the device after closure of the valve; and FIG. 4 is an enlarged horizontal section taken on line 4—4 of FIG. 3.

DESCRIPTION OF THE PREFERRED EMBODIMENT

With reference first to FIG. 1, I have shown at 10 a safety shutoff valve which may typically be connected into a line conducting natural gas or another flammable fluid or the like which is to be automatically closed off in response to an earthquake shock of predetermined intensity. The fluid being controlled enters the device through an inlet conduit 11, which is threadedly connected to the rigid body 12 of the valve assembly at 13. The gas may leave body 12 through an outlet line 14, threadedly connected to the body at 15 and desirably extending along the same axis 16 and inlet 11. The body 12 may be formed of a number of sections cast to the illustrated shape and typically including a lower main section 17, an upper section 18 which movably carries the weight structure 19, and a cover plate 20 for closing one side of the upper section 18. The two parts 18 and 20 form together a hollow structure containing and defining an upper chamber 21 within which the weight structure 19 is movably mounted. More particularly, in the vertical plane of FIG. 1, chamber 21 may be of the illustrated rectangular cross-section, having two parallel side portions 22 and an interconnected top portion 23, with inturned flanges 24 at the lower ends of walls 22 secured to the upper horizontal face 25 of body section 17 by bolts 26. In the transverse plane of FIG. 2, the body has the cross-section illustrated in that figure, with section 18 having a side wall 27 flaring laterally outwardly as it advances downwardly, and with the removable cover 20 at the opposite side of the upper protion of the housing flaring similarly in the opposite direction and peripherally secured to section 18 by spaced screws or other fasteners 29. The downwardly flaring or widening cross-section illustrated in FIG. 2 may continue across the entire length of the upper portion of the housing, between the two opposite end walls 22 of chamber 21.

The fluid flow between aligned inlet and outlet passages 30 and 31 in body section 17 is controlled by a circular valve element 32, which is centered and moves along a vertical axis 33, into and out of engagement with an annular downwardly facing valve seat 34 formed in body 17. The inner end of passage 30 has a downwardly offset portion 35 beneath seat 34, which communicates past seat 34 with an upwardly offset portion 36 of passage 31. Stem 37 connected to valve element 32 projects upwardly along axis 33, through an essentially annular member 38, which is threadedly connected at 39 into an upper opening 40 in part 17 and is sealed with respect thereto by O-rings 41 and with respect to body part 17 by a seal ring 42. At its underside, valve 32 is engaged by a coil spring 42, whose lower end is received within a bottom closure cap 43 threaded into the body at 143, and bears downwardly against a pressure disc 44 adjustable vertically by a screw 45 threadedly connected into bottom wall 46 of cap 43. A lock and seal nut 47 can be tightened against the smoothly ground undersurface of wall 46 in any set position of screw 45 to lock the screw in that position and form a seal with wall 46. A fiber ring 147 in the nut forms a seal between the screw and nut. As will be apparent, adjustment of screw 45 varies the yielding force which is exerted upwardly against valve 32 by the spring. In all positions of screw 45, the spring is desirably under substantial compression, to at all times urge disc 32 toward its full line closed position of FIG. 3. Cap 43 is of course appropriately sealed with respect to body section 17, as by a seal ring 243. The lower section 17 of the body may also carry a by-pass valve element 132, taking the form of a manually actuable screw sealed at 417 and threadedly connected to section 17 at 117 for movement toward and away from a seat 217 to open or close passages 317 for bypassing fluid past valve 32 when closed.

The weight assembly 19 is suspended in depending condition within housing chamber 21 by an upper universal connection 48, having a center of universal pivotal movement at a location 49 along the vertical axis 33. The weight structure includes a first hanging support member 50 and a weight proper 51 which is movably supported on member 50 by an adjustable nut element 52 and supported ring 65 co-acting with an upper second nut part 53. Member 50 is formed as a vertical rod having external threads 54 which in the FIG. 1 position of the valve mechanism are centered about vertical axis 33. To form the universal connection 48, threaded rod 50 has at its upper end a spherical ball portion 55, which is movably connected to top wall 23 of the body of the housing by two similar retaining elements 56 connected to the underside of top wall 23 of the housing as by screws 57 (FIG. 1a) and located at diametrically opposite sides of axis 33. Parts 56 and wall 23 have spherically curved surfaces 58 and 158 curving in correspondence with the outer surface of ball 55 and engaging it movably in a relation forming a ball and socket type universal connection permitting free universal pivotal movement of part 50 about center 49. Slots 157 in parts 56 permit radial adjustment of these parts toward and away from one another to receive and properly fit the ball 55.

The weight element 51 is an annular part, which in the FIG. 1 position of the elements is centered about vertical axis 33, and which has the cross-section illustrated in that figure in all planes containing axis 33. The upper end of weight 51 forms a flat top wall 59 of the weight disposed about threaded rod 50 and having upper and lower parallel planar surfaces 60 and 61 which in the FIG. 1 position of the weight extend horizontally and perpendicular to axis 33. This wall 59 contains a circular opening 62, which may extend vertically through wall 59, and which forms an annular lower corner 63 adapted to engage and be supported by ring 65. To allow universal movement of weight 51 relative to threaded rod 50, the opening 62 is of a diameter substantially greater than the maximum external diameter of the threads on rod 50, and corner 63 formed at the lower end of opening 62 engages an upwardly facing spherically curved annular surface 64 formed on the upper side of ring 65. Spherical surface 64 is centered about a location 66, which in the FIG. 1 setting of the parts is located on vertical axis 33. Thus, ring 65 mounts weight 51 for universal pivotal movement relative to ring 65 and member 50 about center 66. The upper nut 53 on member 50 may have a downwardly projecting portion 67 having an outer cylindrical surface 68 which is centered about axis 33 and of a diameter less than the internal diameter of opening 62 in the weight, to allow the desired universal movement of the weight about center 66, while limiting that movement at the point in which the inner circular edge of top wall 59 of the weight contacts surface 68 of nut 53. The axial length of downwardly projecting portion 67 of nut 53 is great enough to allow sufficient space vertically between ring 65 and the downwardly facing surface 70 on nut 53 to permit the discussed secondary universal movement.

At its lower end, part 50 has a reduced diameter unthreaded externally cylindrical portion 71, about which a cup shaped cap 72 is received. A similar cup shaped element 73 is carried by the upper end of valve stem 37, about an upper reduced diameter externally cylindrical portion 74' of the valve stem. Caps 72 and 73 have faces 74' and 75 which abut vertically against one another in a manner holding the valve in its FIG. 1 open position by force transmitted upwardly through rod 50 to the spherically curved surface 158 formed at the underside of top wall 23 of the housing.

Preferably one of the surfaces 74' or 75 is shaped to have a shallow recess, into which the other surface nests. For this purpose, the undersurface 74' of cap 72 is shown as convexly and spherically curved about a center 76 on axis 33, and upper surface 75 of cap 73 is curved concavely and spherically about the same center, to resist lateral deflection of cap 72 relative to cap 73. The two caps 72 and 73 are sufficiently tight friction fits on the respective carrier members 50 and 37 to frictionally retain these caps on those members even when the weight assembly is in its FIG. 3 laterally displaced open valve condition.

For resetting the valve, an elongated tool 77 is provided, adapted to extend through an opening 78, which is normally closed by a threaded plug 178 and is formed in one of the side walls 22 of body section 18. Tool 77 has a birfurcated portion 79 adapted to extend about valve stem 37 and engage downwardly against outwardly projecting opposite ends of a transverse pin 80 mounted in frictionally retained relation within an opening in stem 37.

To now discuss the manner of use of the described device, assume that the unit is connected to fluid supply and discharge lines 11 and 14 as shown in FIG. 1, and that the valve 32 is held open by weight assembly 19 as in FIG. 1. The gas or other fluid may thus flow past valve 32 without substantial obstruction so long as the valve is held open. If an earthquake shock or the like transmitted to the body of the assembly through the fluid lines or other supporting structure displaces the valve body 12 laterally, the inertia of weight 51 and member 50, particularly the former, resists movement of these parts with the body of the device, thereby tending to cause relative movement between the weight structure and the parts such as valve stem 37 which are connected to the body for movement therewith. If the shock is minor in character, weight 51 may merely pivot about center 63 relative to member 50, as to the broken line position of FIG. 1, and without movement of member 50 relative to body 12 or the other parts or from its valve blocking position. If, however, the shock reaches a predetermined greater intensity for which the valve has been set, the relative movement of weight 51 tends to exceed that illustrated in broken lines in FIG. 1, and tends to cause movement of member 50 with weight 51 about the upper universal connection center 49, as to the position illustrated in FIG. 3. When this displacing force is great enough, the member 50 does actually swing to such a position as that shown in FIG. 3, against the resistance offered by the interfitting convex-concave relationship of surfaces 74 and 75, so that member 50 is no longer aligned vertically with the valve stem and permits upward movement thereof to the FIG. 3 setting in which the valve 32 is closed. In this way, the flammable gas or other fluid is positively shut off, preventing fire or other damage.

After the danger has ended, the device may be reset merely by removing plug 178 and inserting tool 77 through opening 78 of FIG. 3, and then exerting downward force on valve stem 37 through pin 80, by pulling upwardly on the outwardly projecting end portion 81 of the tool and fulcruming the tool about a point of engagement 82 with the wall of opening 78. As soon as the valve stem has been moved downwardly somewhat beneath the position of FIG. 1, the weight 51 and member 50 can swing pendulously to their directly downwardly extending position of FIG. 1, in which cap 72 is received directly above cap 73 so that when the valve stem is then released by tool 77 to move upwardly its motion will again be blocked by engagement with cap 72.

The device allows for very precise adjustment in several ways of the amount of shock force which will be required to open the valve. An initial adjustment can be made by removing caps 72 and 73 and substituting other similar caps of greater or lesser spherical curvature. Also, screw 45 and disc 44 can be adjusted upwardly or downwardly to vary the yielding force exerted upwardly by spring 42 against the valve. Further, weight 51 can be adjusted upwardly and downwardly relative to the main universal connection center 49, by upward or downward adjustment of the two nuts 52 and 53 and the intermediate ring 65. After these parts have been adjusted to a desired new setting, the nuts may be tightened relative to one another to rigidly clamp ring 65 therebetween, and thus by friction between the various parts obtain a lock nut action preventing accidental displacement of these parts upwardly or downwardly along member 50.

The illustrated downwardly flaring annular bell-like configuration of weight 51, with most of its mass formed in a lower portion 151 of the weight, is desirable for enabling location of the center of mass of the weight relatively 49 low with respect to center of the upper universal connection, to attain a maximum sensitivity of response without unduly increasing the overall length of the entire assembly.

While a certain specific embodiment of the present invention has been disclosed as typical, the invention is of course not limited to this particular form, but rather is applicable broadly to all such variations as fall within the scope of the appended claims.

We claim:

1. A safety device comprising a valve unit yieldingly urged toward closed position, a member movable in a lateral direction between a normal position of engagement with said valve unit for holding the valve unit open and a laterally deflected position releasing the valve unit for closing movement, a weight element carried by said member for movement in said lateral direction therewith and operable to move in said lateral direction and displace said member in that direction from said normal position in response to shock, and means mounting said weight element to said member for limited movement relative thereto in response to minor shock forces without release of the valve unit.

2. A safety device comprising a body structure, a valve unit mounted for generally vertical movement relative to said body structure between an upper closed position in which it blocks the flow of fluid past the valve unit and a lower open position permitting said flow, spring means yieldingly urging said valve unit upwardly to said closed position, a shock responsive weight structure, and a universal connection at a location spaced above said valve unit connecting said weight structure to said body structure for universal pivotal movement about essentially a predetermined location relative to said body structure and suspending said weight structure in depending relation with respect to said universal connection so that the weight can hang downwardly by gravity in a predetermined normal position, said weight structure having a lower portion beneath said universal connection which in said normal position is engageable with an upper portion of said valve unit in a relation blocking upward movement of the valve unit from said open position when said weight structure is in said normal position thereof and displaceable laterally to a location out of the path of upward movement of said portion of the valve unit to release the valve unit for upward closing movement upon universal pivotal movement of said weight structure induced by shock,, said weight structure including a threaded member hanging downwardly from said universal connection, a weight element disposed about and suspended by said threaded member, and means engaging the threads of said member adjustably to shift the position of said weight element upwardly and downwardly relative to the member and relative to said universal connection.

3. A safety device as recited in claim 2, in which said member is threaded externally, said means including an internally threaded part supporting said weight element on said member and threadedly engaging said member for upward and downward adjusting movement in a relation adjusting the position of the weight element relative to said member and relative to said universal connection.

4. A safety device comprising a body structure, a valve unit mounted for generally vertical movement relative to said body structure between an upper closed position in which it blocks the flow of fluid past the valve unit and a lower open position permitting said flow, spring means yieldingly urging said valve unit upwardly to said closed position, a shock responsive weight structure, and a universal connection at a location spaced above said valve unit connecting said weight structure to said body structure for universal pivotal movement about essentially a predetermined location relative to said body structure and suspending said weight structure in depending relation with respect to said universal connection so that the weight can hang downwardly by gravity in a predetermined normal position, said weight structure having a lower portion beneath said universal connection which in said normal position is engageable with an upper portion of said valve unit in a relation blocking upward movement of the valve unit from said open position when said weight structure is in said normal position thereof and displaceable laterally to a location out of the path of upward movement of said portion of the valve unit to release the valve unit for upward closing movement upon universal pivotal movement of said weight structure induced by shock, said weight structure including a first member hanging downwardly from said universal connection in a position blocking closing movement of the valve unit, and a weight element mounted to and suspended by said first member and free for limited displacement relative thereto by minor shocks without valve releasing movement of said member.

5. A safety device comprising a body structure, a valve unit mounted for generally vertical movement relative to said body structure between an upper closed position in which it blocks the flow of fluid past the valve unit and a lower open position permitting said flow, spring means yieldingly urging said valve unit upwardly to said closed position, a shock responsive weight structure, and a universal connection at a location spaced above said valve unit connecting said weight structure to said body structure for universal pivotal movement about essentially a predetermined location relative to said body structure and suspending said weight structure in depending relation with respect to said universal connection so that the weight can hang downwardly by gravity in a predetermined normal position, said weight structure having a lower portion beneath said universal connection which in said normal position is engageable with an upper portion of said valve unit in a relation blocking upward movement of the valve unit from said open position when said weight structure is in said normal position thereof and displaceable laterally to a location out of the path of upward movement of said portion of the valve unit to release the valve unit for upward closing movement upon universal pivotal movement of said weight structure induced by shock, said weight structure including a member hanging downwardly from said universal connection, a weight element, and a second universal connection permitting limited universal movement of said weight element relative to said member.

6. A safety device as recited in claim 5, in which said weight element is disposed about said member, said second universal connection including a support part connected to said member for upward and downward adjustment relative thereto and relative to said first mentioned universal connection, and interengaging surfaces on said support part and said weight element supporting the weight element on said part in any of different vertically adjusted positions and shaped to permit limited universal pivotal movement of said weight element relative to said part about a center spaced beneath the center of said first mentioned universal connection.

7. A safety device as recited in claim 6, including an additional part threadedly connected to said member at a location spaced above said support part and above said weight element but beneath said first mentioned universal connection and engageable with said weight element to limit the universal movement thereof relative to said member in any of various different adjusted settings of said two parts relative to said member.

8. A safety device as recited in claim 5, in which said member is externally threaded, said second universal connection including upper and lower nuts connected threadedly onto said member for adjustment upwardly and downwardly relative thereto, and a support part retained between said nuts and about said member, said support part and said weight element having interengaging relatively movable surfaces supporting the weight element for universal movement relative to the said support part and said member.

9. A safety device as recited in claim 8, in which said upper nut has a downwardly projecting tubular portion tightenable downwardly against said lower nut and received within an opening in said weight element, but with clearance permitting said universal movement of the weight element relative to said member while limiting such movement by engagement of said downwardly projecting tubular portion of said upper nut with the weight element at said opening.

10. A safety device as recited in claim 9, in which said interengaging surfaces on said support part and said weight element include a spherically curved upwardly facing surface on said support part about said member engageable with said weight element about said member in universally movable supporting relation.

11. A safety device as recited in claim 5, in which said second universal connection includes means carried by said member and forming an upwardly facing spherically curved surface engageable with said weight element in universally supporting relation.

12. A safety device as recited in claim 5, in which said first mentioned universal connection is a ball and socket joint between said member and said body structure.

13. A safety device comprising a body structure, a valve unit mounted for generally vertical movement relative to said body structure between an upper closed position in which it blocks the flow of fluid past the valve unit and a lower open position permitting said flow, spring means yeildingly urging said valve unit upwardly to said closed position, a shock responsive weight structure, and a universal connection at a location spaced above said valve unit connecting said weight structure to said body structure for universal pivotal movement about essentially a predetermined location relative to said body structure and suspending said weight structure in depending relation with respect to said universal connection so that the weight can hang downwardly by gravity in a predetermined normal position, said weight structure having a lower portion beneath said universal connection which in said normal position is engageable with an upper portion of said valve unit in a relation blocking upward movement of the valve unit from said open position when said weight structure is in said normal position thereof and displaceable laterally to a location out of the path of upward movement of said portion of the valve unit to release the valve unit for upward closing movement upon universal pivotal movement of said weight structure induced by shock, said spring means including coil spring means and a member backing up said coil spring means against downward movement and connected to said body structure threadedly for upward and downward adjustment to vary the effective force of said spring means.

14. A safety device comprising a body structure, a valve unit mounted for generally vertical movement relative to said body structure between an upper closed position in which it blocks the flow of fluid past the valve unit and a lower open position permitting said flow, spring means yieldingly urging said valve unit upwardly to said closed position, a shock responsive weight structure, and a universal connection at a location spaced above said valve unit connecting said weight structure to said body structure for universal pivotal movement about essentially a predetermined location relative to said body structure and suspending said weight structure in depending relation with respect to said universal connection so that the weight structure can hang downwardly by gravity in a predetermined normal position, a first cap carried removably by an upper portion of said valve unit, a second cap carried removably by a lower portion of said weight structure at a location beneath said universal connection, said second cap in said normal position of the weight structure being engageable with said first cap carried by the valve unit in a relation blocking upward movement of the valve unit from said open position when said weight structure is in said normal position thereof, and being displaceable laterally to a location out of the path of upward movement of said first cap to release the valve unit for upward closing movement upon universal pivotal movement of said weight structure induced by shock, said first and second removable caps having interengaging surfaces one of which contains a shallow recess into which the other projects a short distance to resist valve releasing lateral displacement of said weight structure.

15. A safety device as recited in claim 14, in which said interengaging surfaces on said two caps are of similar spherical convex and concave curvature.

* * * * *